No. 766,967. PATENTED AUG. 9, 1904.
A. T. NEWMAN.
CAMERA.
APPLICATION FILED JAN. 31, 1903. RENEWED JAN. 9, 1904.
NO MODEL. 2 SHEETS—SHEET 2.
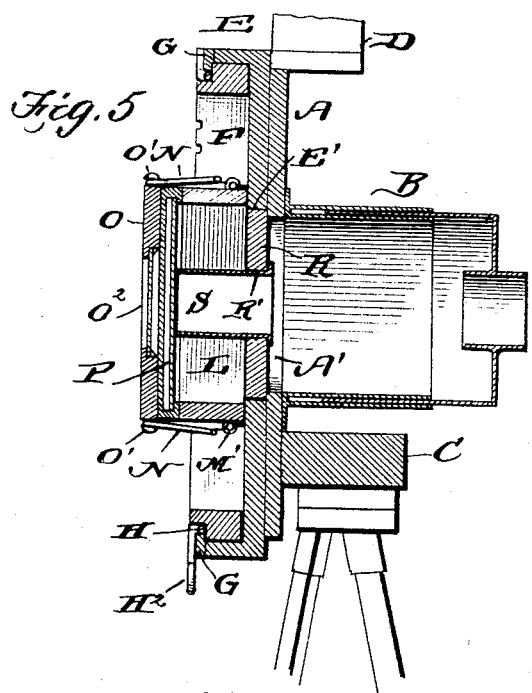
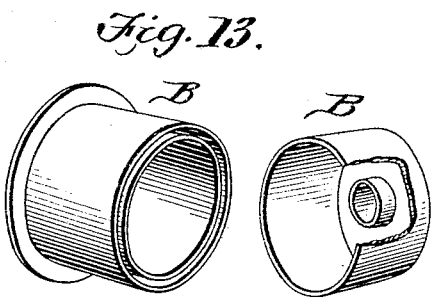
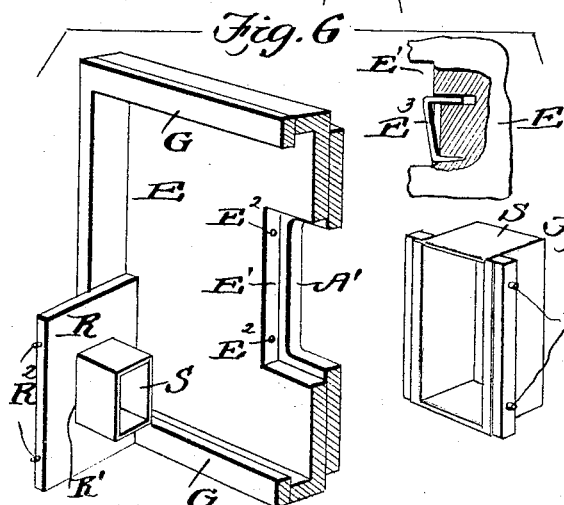
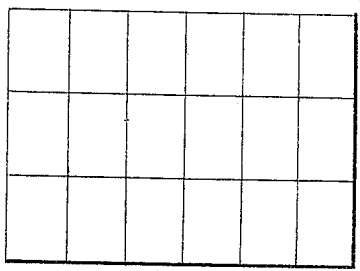
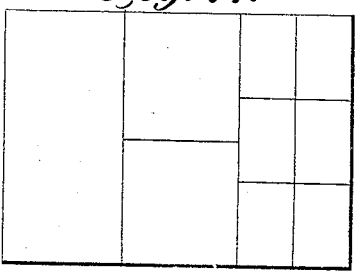
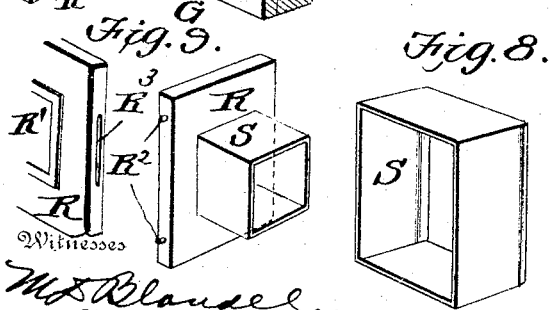
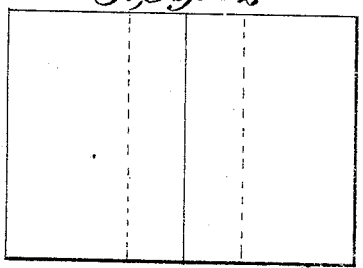
Witnesses
Inventor
A. T. Newman
By his Attorneys No. 766,967. Patented August 9, 1904.

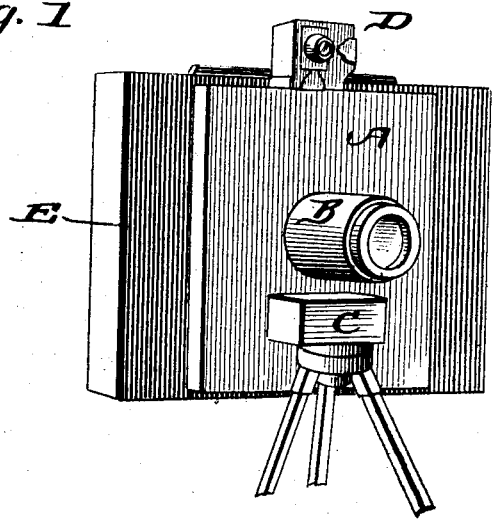
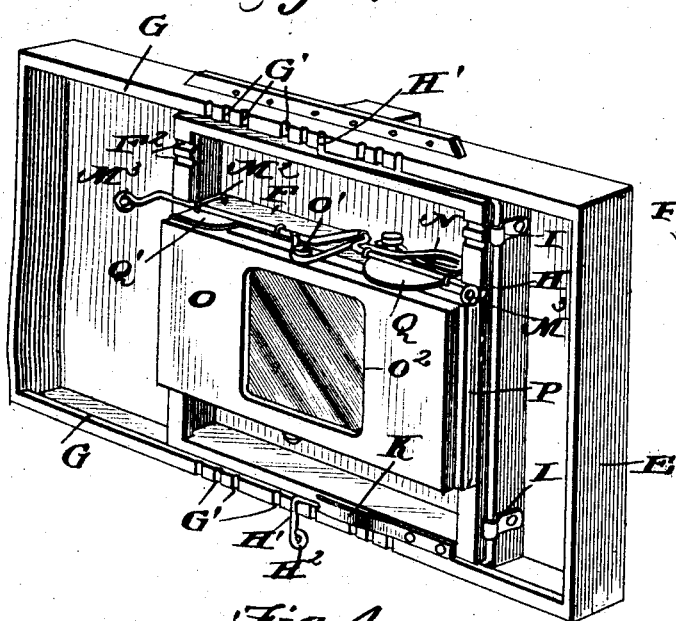
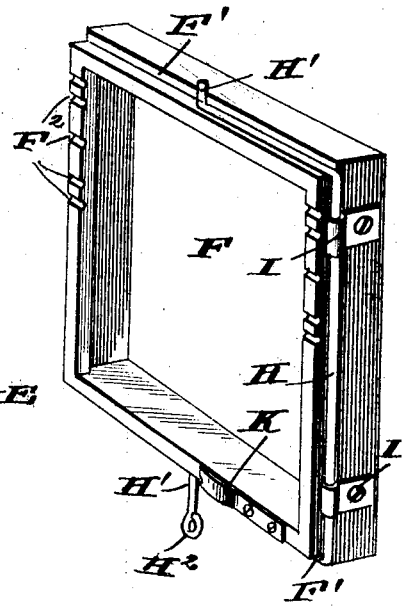
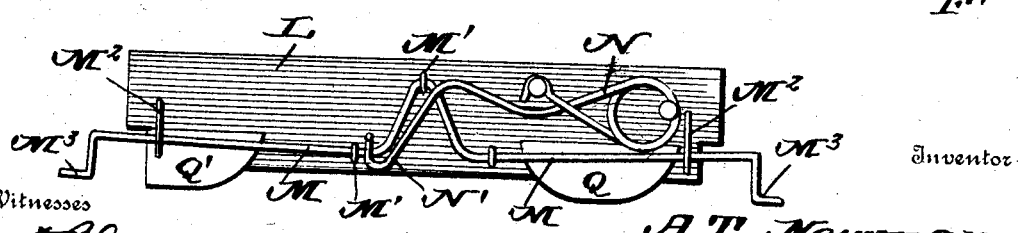

UNITED STATES PATENT OFFICE.

ALBERT T. NEWMAN, OF GREELEY, KANSAS.

CAMERA.

SPECIFICATION forming part of Letters Patent No. 766,967, dated August 9, 1904.

Application filed January 31, 1903. Renewed January 9, 1904. Serial No. 188,407. (No model.)

*To all whom it may concern:*

Be it known that I, ALBERT T. NEWMAN, a citizen of the United States, residing at Greeley, in the county of Anderson and State of Kansas, have invented a new and useful Improvement in Cameras, of which the following is a specification.

This invention relates generally to cameras, and has for its object to provide a simple and efficient means whereby a number of negatives can be made upon the same plate without removing the said plate from the camera.

Another object is to provide means whereby negatives of various sizes and shapes can be made upon the same plate without removing the said plate from the camera.

With these objects in view the invention consists in the novel features of construction, combination, and arrangement, all of which will be fully described hereinafter and pointed out in the claims.

In the drawings forming part of this specification, Figure 1 is a perspective view showing the exterior of a camera constructed and arranged in accordance with my invention. Fig. 2 is a perspective view showing the rear portion of a camera constructed in accordance with my invention. Fig. 3 is a perspective view of the horizontally-movable frame. Fig. 4 is a top plan view of the vertically-movable frame for carrying the plate-holder. Fig. 5 is a vertical sectional view. Fig. 6 is a detail perspective, partly in section. Figs. 7, 8, and 9 are detail perspective views, and Figs. 10, 11, and 12 are views illustrating the manner of subdividing the negative-plate and illustrating the different sizes and shapes of negatives which can be made upon one plate. Fig. 13 is a detail view.

In carrying out my invention I employ a board or plate A, having a central opening A', which is surrounded by the usual construction of telescopic lenses carrying the tube B. This board or plate also has a block C, to which the supporting-tripod is attached, and upon the upper end of such board or plate is arranged a universal view-finder D. A shallow box or case E is attached to the board or plate A upon the rear side thereof, said box or case having a rectangular-shaped opening E' produced in the front side thereof, which opening is slightly larger than the opening A' in the board or plate A. A horizontally-sliding frame F is arranged within the shallow box or case E, said frame being constructed with rabbeted shoulders F' upon its upper and lower edges, said rabbeted edges being engaged by the retaining-strips G, connected to the box or case at its upper and lower edges and serving to hold the frame F within the box or case, but at the same time permitting said frame to have a free horizontal movement within the said box or case. The frame F has an essentially rectangular-shaped bail H pivotally connected thereto by means of the spring-clips I, the ends of said bail being turned at an angle, as shown at H', in order to engage the notches G', cut in the faces of the strips G, for the purpose of locking the frame F in its adjusted position, there being a plurality of notches arranged at predetermined points, so that when the ends of the bail are in engagement with certain notches the operator will be advised of the relative position of the frame F with reference to the central opening. One end of the bail H is formed into a loop $H^2$, providing a suitable handle by means of which the bail can be manipulated for the purpose of throwing the ends into or out of engagement with the notches and also for the purpose of shifting the frame F horizontally within the box or case E. A leaf-spring K is secured to one side of the frame F and bears upon the bail H adjacent to one of the angular ends H' and serves to hold the said bail in its proper position, so that the ends are always ready to engage notches G'. A second frame L is arranged within the first-named frame F, said frame L being adapted to move vertically within the frame F or in directions at right angles to the movement of the frame F. The frame L is provided with a rod M, connected thereto by means of staples M', the end portions working in guides $M^2$ and adapted to engage notches $F^2$ cut in the side members of the frame F. The extreme ends of the rod M are bent and looped, as shown at $M^3$, in order to provide handles for operating the said rod. The central portion of this rod is curved or bent, so that the normal tendency of the rod at the end portion is to spring inwardly and engage the notches F². These notches are arranged according to a predetermined plan and serve to indicate to the operative the relative position of the frame L with reference to the central opening. This frame L is intended to carry the plate-holder containing the plate upon which the negatives are to be produced, and the frame L is provided with a back piece O, which is yieldingly held in contact with the frame L by means of the springs N, connected to the upper and lower ends of the frame L, their free ends N' being adapted to engage pins O', carried by the back piece O, the ends M' being hooked in order to readily engage the said pins. The back piece O has a central opening O², in which is arranged a piece of ground glass, so that the object to be photographed can be thrown thereon as usual. The plate-holder P is slid between the frame L and the back piece O, guides Q and Q' being carried by the frame L to guide the said plate-holder, the guides Q' being angular in form and serving to stop the plate-holder.

By means of the construction herein shown and described it is obvious that the plate can be adjusted to various positions above and below and to each side of the central line of the camera, so that the image or object to be photographed can be made to appear upon the various portions of the plate, and it will of course be understood that when the object or image is thrown upon one portion of the plate the other portions of the plate will be unaffected by the rays of light. In this manner I am enabled to produce a variety of different negatives upon the same plate by simply adjusting the frames F and L horizontally and vertically. Thus it will be seen that by shifting the frame F horizontally three times in each direction six different negatives in horizontal line can be produced, and by shifting the frame L vertically three times, three vertical rows of negatives can be produced, and in all eighteen different negatives can be made upon the same plate. This form of subdividing the plate is illustrated in Fig. 10. In addition to adjusting the plate I also propose to regulate the size of the negative and likewise the shape thereof, and in order to do this I employ a block R, having an opening R' produced therein, said opening having a tube S arranged therein, said tube extending rearwardly toward the plate, so that the rays of light are directed against the proper portion of the plate and shut out from reaching any other portion. This block R has pins R², which fit in openings E², produced in one side of the opening E', and the opposite edge of the block R has a groove R³, in which is adapted to fit the spring-catch E³, arranged in the opposite side of the opening E'. By having various sizes or shapes of openings in different blocks R different sizes and shapes of negatives can be produced. In Fig. 7 a vertically-elongated negative would be produced. In Fig. 8 a square negative can be produced, and in Fig. 9 a small rectangular negative would be produced.

It will thus be seen that I provide an improved construction of camera, in which the plate can be adjusted so as to produce a number of negatives upon the plate without removing the same from the negative, and, furthermore, by means of the construction herein shown and described I am enabled to produce negatives of various sizes and shapes, as desired.

Having thus fully described my invention, what I claim as new, and desire to secure by Letters Patent, is—

1. A camera comprising a casing open at the rear, strips along the upper and lower rear edges of the casing, said strips being notched at predetermined points, a frame sliding horizontally in said casing, the vertical side members of said frame being notched, a plate-holder sliding vertically in said frame, a wire member connected to the frame engaging the notches in the strips, and a wire member connected to the plate-holder engaging the notches in the sides of the frame.

2. In a camera a box or case having an opening in its forward side, said opening having a tube arranged therein through which the rays of light pass, a vertically and horizontally movable frame arranged within the box or case, said frame having a back connected thereto by yielding connections, and a plate-holder adapted to be inserted between the frame and back, said frame carrying guides for the said plate-holder.

3. In a camera a shallow box or case having an opening in the front thereof, a block adapted to be arranged in said opening, said block carrying a tube through which the rays of light are adapted to pass, a vertically-movable frame, and a horizontally-movable frame carrying the vertically-movable frame, the vertically-movable frame having a spring-rod adapted to engage notches produced in the horizontally-movable frame, said horizontally-movable frame having a spring-actuated bail adapted to engage notches produced in the strips secured to the upper and lower edges of the box or case, a yielding back piece carried by the vertically-movable frame, and a plate-holder adapted to be inserted between the said frame and back piece, as specified.

ALBERT T. NEWMAN.

Witnesses:
A. D. WOOD,
J. M. ACHESON.